(12) United States Patent
Matsuda

(10) Patent No.: US 11,897,402 B2
(45) Date of Patent: Feb. 13, 2024

(54) CONTROL DEVICE

(71) Applicant: KABUSHIKI KAISHA TOKAI RIKA DENKI SEISAKUSHO, Aichi (JP)

(72) Inventor: Yasutaka Matsuda, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 324 days.

(21) Appl. No.: 17/419,959

(22) PCT Filed: Nov. 28, 2019

(86) PCT No.: PCT/JP2019/046609
§ 371 (c)(1),
(2) Date: Jun. 30, 2021

(87) PCT Pub. No.: WO2020/144967
PCT Pub. Date: Jul. 16, 2020

(65) Prior Publication Data
US 2022/0063524 A1 Mar. 3, 2022

(30) Foreign Application Priority Data
Jan. 9, 2019 (JP) ................................ 2019-001650

(51) Int. Cl.
*B60R 16/027* (2006.01)
*B62D 1/08* (2006.01)
*G06F 3/041* (2006.01)

(52) U.S. Cl.
CPC .............. *B60R 16/027* (2013.01); *B62D 1/08* (2013.01); *G06F 3/0414* (2013.01); *G06F 3/0418* (2013.01)

(58) Field of Classification Search
CPC ........ B60R 16/027; B62D 1/08; B62D 1/046; B60K 2370/139; B60K 2370/1446;
(Continued)

(56) References Cited

U.S. PATENT DOCUMENTS

2004/0195031 A1   10/2004  Nagasaka
2017/0090572 A1*  3/2017  Holenarsipur ........ G06F 3/0362
2017/0242530 A1   8/2017  Yamasaki

FOREIGN PATENT DOCUMENTS

JP      2003-137103        5/2003
JP      2012-194997 A     10/2012
(Continued)

OTHER PUBLICATIONS

International Search Report issued in International Bureau of WIPO Patent Application No. PCT/JP2019/046609, dated Jan. 7, 2020, along with an English translation thereof.
(Continued)

*Primary Examiner* — Jean F Duverne
(74) *Attorney, Agent, or Firm* — GREENBLUM & BERNSTEIN, P.L.C.

(57) ABSTRACT

To provide more appropriate input by using an input section installed on a controller, which is operated by a user.
Provided is a control device including: an input detection section configured to detect input provided by a user to an input section installed on a controller that is operated by the user; and an erroneous input determination section configured to determine whether or not the input is erroneous input, on the basis of the input.

11 Claims, 9 Drawing Sheets

(58) Field of Classification Search
CPC ........ B60K 2370/199; B60K 2370/782; B60K 37/06; G06F 3/044
See application file for complete search history.

(56) References Cited

FOREIGN PATENT DOCUMENTS

| JP | 2013-075652 | 4/2013 | |
|---|---|---|---|
| JP | 2013075655 A * | 4/2013 | ........... B60R 16/023 |
| JP | 2016-167241 | 9/2016 | |
| JP | 2017-095066 | 6/2017 | |
| JP | 2017-151504 A | 8/2017 | |

OTHER PUBLICATIONS

Written Opinion issued in International Bureau of WIPO Patent Application No. PCT/JP2019/046609, dated Jan. 7, 2020.
Official Communication issued in International Bureau of WIPO Patent Application No. PCT/JP2019/046609, dated Jan. 7, 2020, along with an English translation thereof.
Official Communication issued in International Bureau of WIPO Patent Application No. PCT/JP2019/046609, dated Jan. 7, 2020.

\* cited by examiner

CONTROL DEVICE

TECHNICAL FIELD

The present invention relates to a control device.

BACKGROUND ART

In recent years, various kinds of input methods using a variety of controllers have been proposed. For example, Patent Literature 1 listed below discloses a technology of nullifying input provided to a touch switch (input section) or the like when rotation of a steering wheel (controller) of a car is detected in the case where the steering wheel is provided with the touch switch or the like. This makes it possible to prevent erroneous input, which is provided when a user turns the steering wheel for making a right turn, a left turn, or the like and a hand of the user comes into contact with the touch switch unintentionally.

CITATION LIST

Patent Literature

Patent Literature 1: JP 2003-137103A

DISCLOSURE OF INVENTION

Technical Problem

However, when using the technology disclosed in Patent Literature 1, it is impossible even to provide intended input when the user turns the steering wheel.

Accordingly, the present invention is made in view of the aforementioned issues, and an object of the present invention is to provide a novel and improved control device that makes it possible to provide more appropriate input by using an input section installed on a controller, which is operated by a user.

Solution to Problem

To solve the above-described problems, there is provided a control device including: an input detection section configured to detect input provided by a user to an input section installed on a controller that is operated by the user; and an erroneous input determination section configured to determine whether or not the input is erroneous input, on the basis of the input.

In addition, the erroneous input determination section may determine whether or not the input is erroneous input, on the basis of a region in which the input is detected in the input section.

In addition, the erroneous input determination section may determine that the input is the erroneous input in a case where the region in which the input is detected in the input section includes at least a portion of an erroneous input detection region, which is set in the input section.

The erroneous input detection region may include at least a portion of a vicinity of a border of the input section.

The erroneous input determination section may determine whether or not the input is erroneous input, on the basis of size or a shape of the region in which the input is detected in the input section.

The erroneous input determination section may change a method of determining whether or not the input is erroneous input, on the basis of a situation where the user performs control by using the controller.

The input section may include at least any one of an input section of receiving input provided by touch and an input section of receiving input provided by pressure.

The controller may include a steering wheel of a vehicle, and the input section may be installed on a spoke section of the steering wheel.

Advantageous Effects of Invention

According to the present invention, it is possible to provide more appropriate input by using an input section installed on a controller, which is operated by a user.

MODE(S) FOR CARRYING OUT THE INVENTION

Hereinafter, preferred embodiments of the present invention will be described in detail with reference to the appended drawings. Note that, in this specification and the appended drawings, structural elements that have substantially the same function and structure are denoted with the same reference signs, and repeated explanation of these structural elements will be omitted.

<1. Overview of Embodiment of Present Invention>

First, an overview of an embodiment of the present invention will be described.

Figure 1:
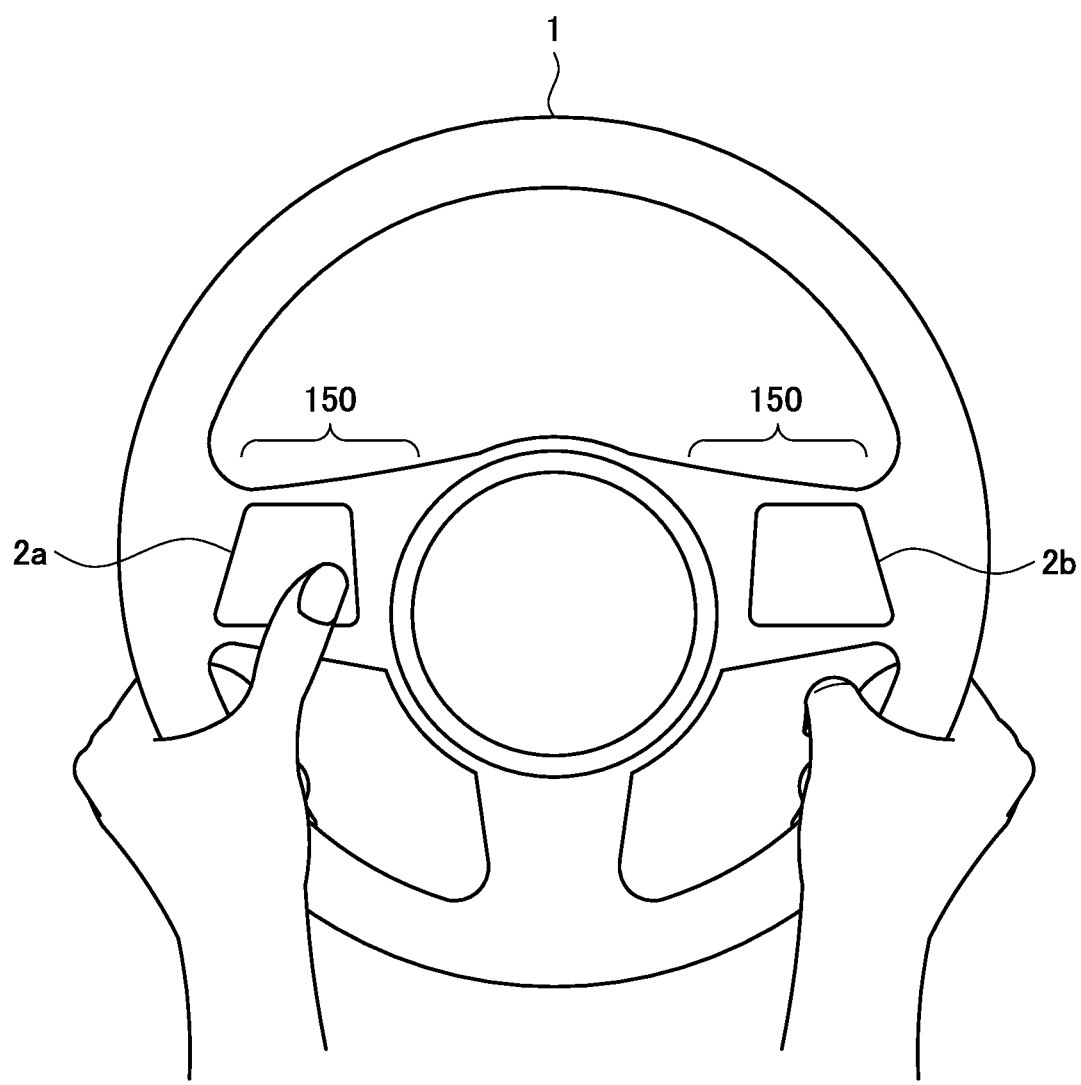
FIG. 1 is a diagram for describing a touch switch (input section) installed on a spoke section of a steering wheel of a car.

In recent years, various kinds of input methods using a variety of controllers have been proposed as described above. For example, as illustrated in FIG. 1 (or Patent Literature 1 listed above), spoke sections 150 or the like of a steering wheel 1 (controller) of a car are provided with touch switches 2. (In the example illustrated in FIG. 1, a touch switch 2*a* and a touch switch 2*b* are installed on left and right spoke sections 150. Hereinafter, they are simply referred to as the "touch switches 2" when there is no need to distinguish them.) This allows a user to provide various kinds of input by touching a touch switch 2 with his/her thumb or the like while operating the steering wheel 1. For example, when the user touches the touch switch 2, it is possible to display various kinds of information such as a menu screen on a head-up display (HUD) or a multi-information display (MUD). In addition, when the user touches the touch switch 2, it is possible to achieve various kinds of functions (for example, mirror operation, wiper operation, sound output volume adjustment, and the like).

Figure 2:
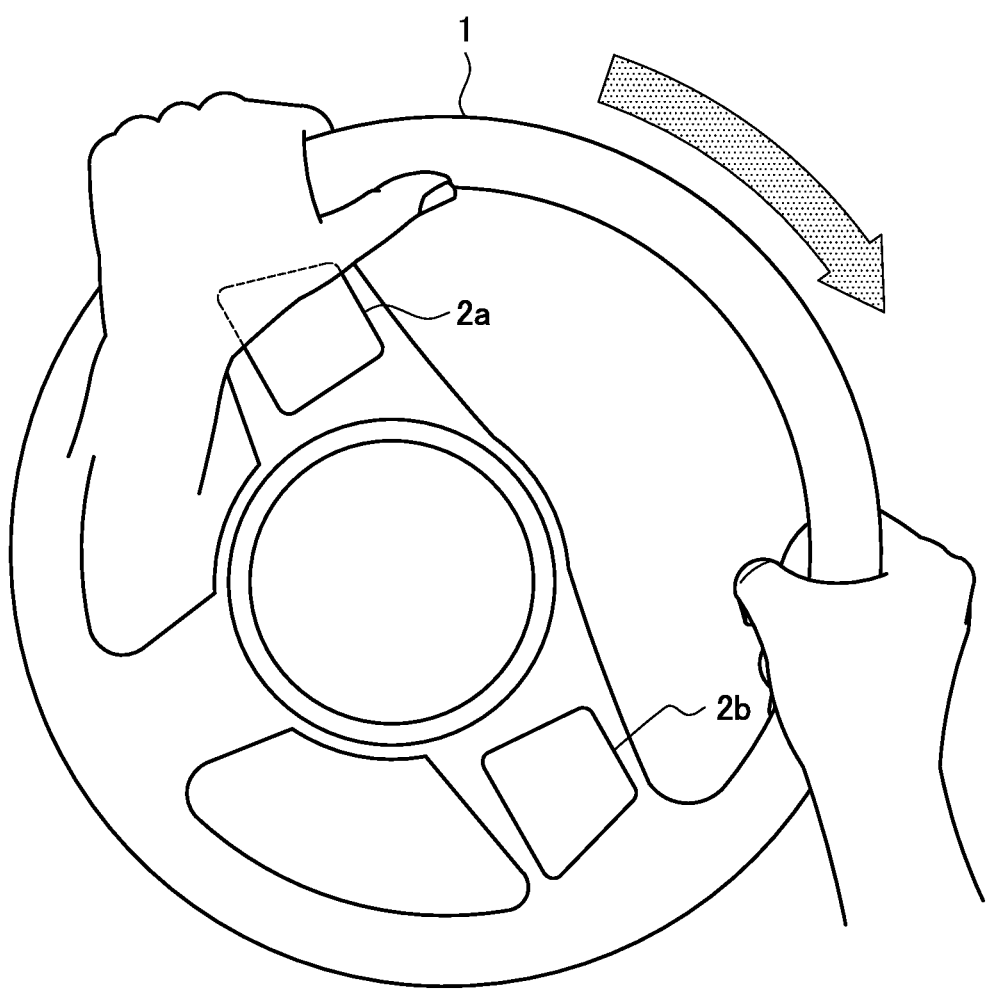
FIG. 2 is a diagram illustrating an example in which erroneous input is provided to the touch switch (input section) installed on the spoke section of the steering wheel of the car.

However, in this case, sometimes the user may unintentionally touch a touch switch 2 with operation of the steering wheel 1 of the car, and may provide erroneous input (hereinafter, the unintentional touch will be referred to as "erroneous touch"). For example, in the case of turning the steering wheel 1 to the right for making a right turn as illustrated in FIG. 2, sometimes the user may erroneously touch the touch switch 2*a* with a left palm and may provide erroneous input. The touch switch 2*a* is installed on the left spoke section 150 of the steering wheel 1. In a similar way, sometimes erroneous input may be provided by erroneously touching the touch switch 2 in various kinds of driving situations including a situation of making a left turn and the like. For example, when the erroneous input is provided, the HUD, the MID, or the like displays various kinds of information, and this makes it difficult for the user to drive the car, and this causes a feeling of discomfort (sometimes this may trigger an accident).

In addition, Patent Literature 1 listed above discloses the technology of nullifying input provided to a touch switch (input section) or the like when rotation of a steering wheel (controller) of a car is detected in the case where the steering wheel is provided with the touch switch or the like. However, when using this technology, it is impossible even to provide intended input when a user turns the steering wheel.

Figure 3:
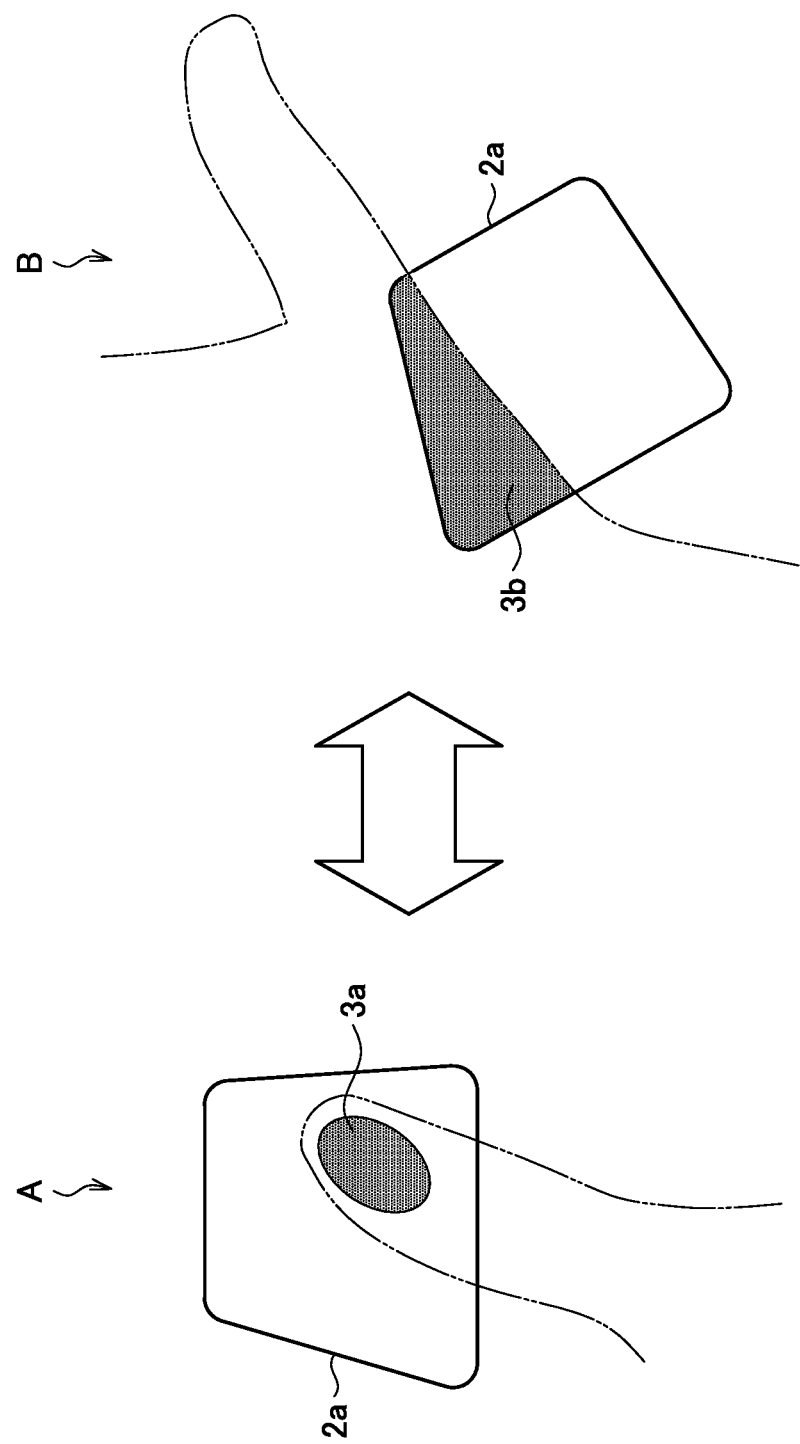
FIG. 3 is a diagram for describing a difference between intended input and erroneous input, which are provided by a user to the touch switch (input section) installed on the spoke section of the steering wheel of the car.

Here, with reference to FIG. 3, details of a difference between intended input and erroneous input, which are provided by a user in the case where the touch switch is installed on the left spoke section 150 of the steering wheel, will be considered. FIG. 3A is a diagram illustrating a specific example of an input detection region 3*a* obtained in the case where intended input is provided by using a left thumb. FIG. 3B is a diagram illustrating a specific example of an input detection region 3*b* obtained in the case where erroneous input is provided by using a left palm. In the case where the erroneous input is provided as illustrated in FIG. 3B, the input detection region 3*b* includes a vicinity of a border of the touch switch 2*a* (a vicinity of a left border of the touch switch 2*a* in the example illustrated in FIG. 3B), and the input detection region 3*b* has a larger area. On the other hand, in the case where the intended input is provided by the user as illustrated in FIG. 3A, the input detection region 3*a* does not include the vicinity of the border of the touch switch 2*a* and the input detection region 3*a* has a smaller oval area (the shape is not necessarily limited to the oval shape). Note that, FIG. 3A and FIG. 3B illustrate mere examples. The input detection region obtained in the case where the user provides intended input or erroneous input is not limited to the examples illustrated in FIG. 3. In addition, it should be noted that the touch switch 2*a* is implemented by a capacitance sensor or the like, and the shapes of electrodes of the capacitance sensor are not taken into consideration in the example illustrated in FIG. 3.

The inventor of the present invention created the present invention in view of the aforementioned issues. A control device according to the present embodiment detects input provided by a user to an input section installed in a controller that is operated by the user, and determines whether or not the input is erroneous input, on the basis of the input. More specifically, the control device according to the present embodiment determines whether or not the input is erroneous input, on the basis of a region in which the input is detected in the input section.

Figure 4:
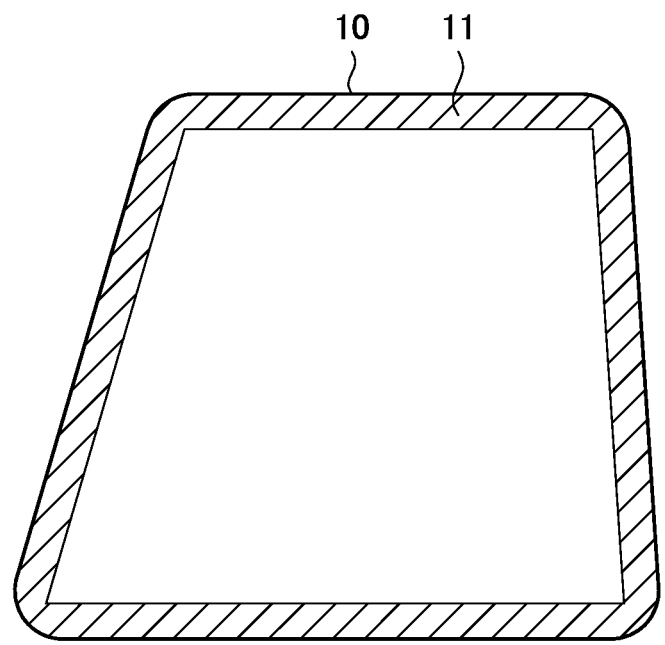
FIG. 4 is a diagram illustrating an example in which an erroneous input detection region is set with regard to a border of the touch switch according to the present embodiment.

For example, the control device according to the present embodiment determines that the input is erroneous input in the case where an "erroneous input detection region 11" is set with regard to a border of a touch switch 10 (input section) as illustrated in FIG. 4 and a region in which input is detected in the touch switch 10 includes at least a portion of the erroneous input detection region 11. The erroneous input detection region 11 is a region for detecting erroneous input. As illustrated in FIG. 3B, the input detection region 3*b* includes the vicinity of the border of the touch switch 2*a* (input section) in the case where the erroneous input is provided. In this case, it is possible for the control device according to the present embodiment to detect the erroneous input more appropriately when the erroneous input detection region 11 is set with regard to the border of the touch switch 10 (input section) as illustrated in FIG. 4.

Here, it is sufficient to set the "erroneous input detection region 11" in such a manner that the erroneous input detection region 11 includes at least a portion of the vicinity of the border of the touch switch 10 (input section). For example, the erroneous input detection region 11 does not have to include the whole border of the touch switch 10. It is sufficient for the erroneous input detection region 11 to include a region easily touched by the user with his/her hand (not necessarily limited to the hand) in the case of providing erroneous input. In addition, the erroneous input detection region 11 does not necessarily have to include the border of the touch switch 10. The erroneous input detection region 11 may include a region that is a predetermined distance away from the border of the touch switch 10. In addition, the erroneous input detection region 11 may emit light or may be painted in a different color from other regions, in such a manner that the user appropriately recognizes the erroneous input detection region 11.

In addition, the "controller" is not necessarily limited to the steering wheel of the vehicle (car in particular). Any controller may be used as long as the controller is usable for operation of some sort of device. For example, the controller includes a steering wheel of every kind of vehicle (such as locomotive, train, bus, and motorcycle), a yoke of an airplane, a ship's wheel, a steering wheel of a simulator (including driving simulator and the like, for example), a game controller, a controller of a radio-controlled model (RC model), an unmanned aerial vehicle, and the like. Hereinafter, an example in which the controller is the steering wheel of the vehicle (car in particular) will be described.

In addition, the "input section" is not necessarily limited to the touch switch 10. Any input section may be used as long as it is possible for the input section to receive input provided by the user. More specifically, it is assumed that the input section includes at least any of an input section (such as a touch switch, a touchpad, or a touchscreen, for example) of receiving input provided by touch and an input section (such as a mechanical switch including a two-stage switch) of receiving input provided by pressure (however, the input section is not necessarily limited thereto). In addition, an installation position of the input section on the controller is not specifically limited. Hereinafter, an example in which the input sections are installed on the spoke sections 150 of the steering wheel (controller) will be described. In addition, it should be noted that the input section includes not only the touch sensor 10 but also a user touch detection sensor that makes it possible to detect touch when the user touches the sensor in the case where the erroneous input detection region 11 is configured in such a manner that the user touch detection sensor is prepared outside the touch switch 10 (not limited to the touch switch 10) (in other words, in the case where the erroneous input detection region 11 is prepared outside the touch switch 10). The case where the erroneous input detection region 11 is configured in such a manner that the user touch detection sensor is prepared outside the touch switch 10, will be described later in detail.

<2. Configuration Example>

Figure 5:
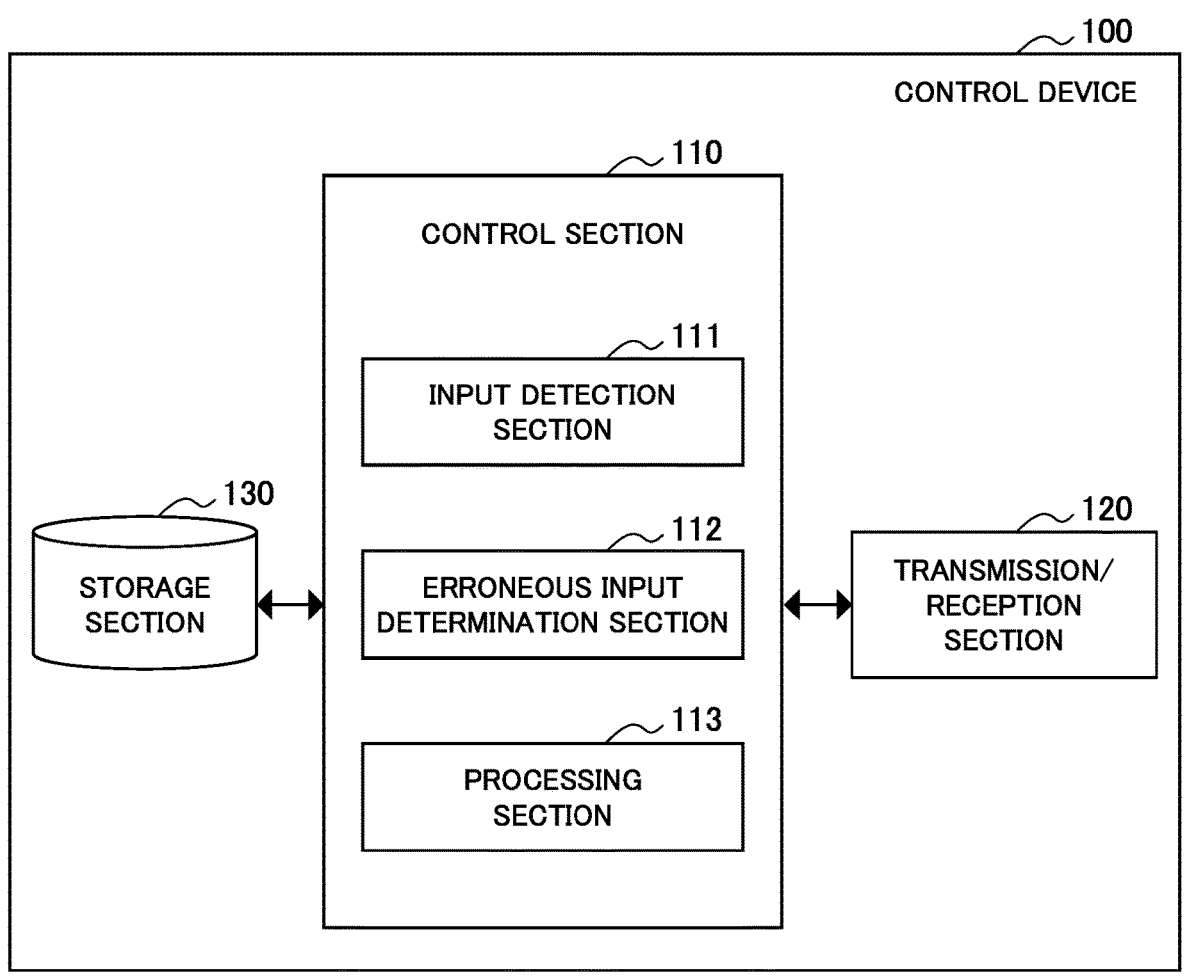
FIG. 5 is a block diagram illustrating a configuration example of a control device according to the present embodiment.

The overview of the embodiment of the present invention has been described above. Next, a configuration example of a control device 100 according to the present embodiment will be described with reference to FIG. 5. FIG. 5 is a block diagram illustrating the functional configuration example of the control device 100 according to the present embodiment.

As illustrated in FIG. 5, the control device 100 according to the present embodiment includes a control section 110, a transmission/reception section 120, and a storage section 130. In addition, the control section 110 includes an input detection section 111, an erroneous input determination section 112, and a processing section 113.

The control section 110 is a structural element that integrally controls overall processes performed by the control device 100. For example, the control section 110 makes it possible to control start and stop of the respective structural elements. For example, the control section 110 may be implemented by a processor such as a central processing unit (CPU) or a microcontroller unit (MCU). Note that, contents of the control of the control section 110 are not limited thereto.

The input detection section 11 is a structural elements that detects input provided by the user to the input section installed on the controller, which is operated by the user. For example, when the user touches the touch switch 10 serving as the input section, the input detection section 111 detects that the touch switch 10 is touched on the basis of a signal provided by the touch switch 10, and recognizes a touched position. The input detection section 111 provides information related to the detected input (this information includes information related to the touched position or the like. Hereinafter this information will be referred to as "input information") to the erroneous input determination section 112.

The erroneous input determination section 112 is a structural element that determines whether or not the input is erroneous input, on the basis of the input detected by the input detection section 111. As described above, the erroneous input determination section 112 determines whether or not the input is erroneous input, on the basis of a region in which the input is detected in the touch switch 10. For example, the erroneous input determination section 112 determines that the input is erroneous input in the case where the region in which the input is detected in the touch switch 10 includes at least a portion of the erroneous input detection region 11, which is set with regard to the touch switch 10. The erroneous input determination section 112 provides the input information to the processing section 113 in the case where it is determined that the input provided by the user is not the erroneous input. On the other hand, instead of providing the input information to the processing section 113, the erroneous input determination section 112 provides information indicating that the input is erroneous input (hereinafter, referred to as "erroneous input information"), to the processing section 113 in the case where it is determined that the input provided by the user is the erroneous input.

The processing section 113 is a structural element that executes various kinds of process on the basis of the input information and the erroneous input information. For example, the processing section 113 generates information (hereinafter, referred to as "control information") for controlling the various kinds of structural elements on the basis of the input information, and provides the control information to the various kinds of structural elements. This makes it possible to display various kinds of information such as the menu screen on the HUD or the MID, and achieve the various kinds of functions (for example, mirror operation, wiper operation, sound output volume adjustment, and the like).

In addition, it is also possible for the processing section 113 to output a warning to prompt the user to provide intended input by providing the control information to the various kinds of structural elements on the basis of the erroneous input information. Note that, if the warning is output each time the erroneous input is provided, there is a possibility that this may bother the user during driving the car or this may cause a feeling of discomfort. Therefore, the processing section 113 may adjust output of the warning appropriately. For example, in the case where erroneous input is provided at a frequency higher than a predetermined value, the processing section 113 may reduce the number of times of issuing the warning subsequently. Note that, contents of processes to be achieved by the processing section 113 are not limited to the above-described processes.

The transmission/reception section 120 is a structural element that transmits/receives information to/from an outside structural element or device. For example, in the case where the user provides input by touching the touch switch 10, the transmission/reception section 120 receives a signal related to the input from the touch switch 10 via an in-vehicle network or the like. In addition, in the case where the processing section 113 generates the control information for controlling the various kinds of structural elements on the basis of the input information, the transmission/reception section 120 transmits the control information to the various kinds of structural elements via the in-vehicle network, and this allows the various kinds of structural elements to achieve respective processes, for example. Note that, contents of the information transmitted/received by the transmission/reception section 120 are not limited to the above-described information. In addition, a method of transmitting/receiving the information from/to the transmission/reception section 120 is not specifically limited. In addition, for example, the transmission/reception section 120 may have a function of a wired or wireless local area network (LAN), Bluetooth (registered trademark), a communication card for Wireless USB (WUSB), a router for optical communication, a router for asymmetric digital subscriber line (ADSL), a modem for various kinds of communication, or the like.

The storage section 130 is a structural element that stores various kinds of information. For example, the storage section 130 stores a program, a parameter, and the like, which are used by the control section 110 and the transmission/reception section 120. In addition, the storage section 130 may store a processing result of the control section 110, information provided by an external device via the transmission/reception section 120, and the like. Note that, contents of the information stored in the storage section 130 are not limited thereto. For example, the storage section 130 may be implemented by read-only memory (ROM), random-access memory (RAM), or the like.

The configuration example of the control device 100 has been described above. Note that, the configuration described above with reference to FIG. 5 is a mere example. The configuration of the control device 100 is not limited thereto. For example, the control device 100 does not have to include some of the structural elements illustrated in FIG. 5, or the control device 100 may include a structural element that is not illustrated in FIG. 5. In addition, a structural element illustrated in FIG. 5 may be installed in the external device (not illustrated), and the above-described functions may be achieved when the control device 100 communicates and cooperates with the external device.

<3. Processing Flow Example>

Figure 6:
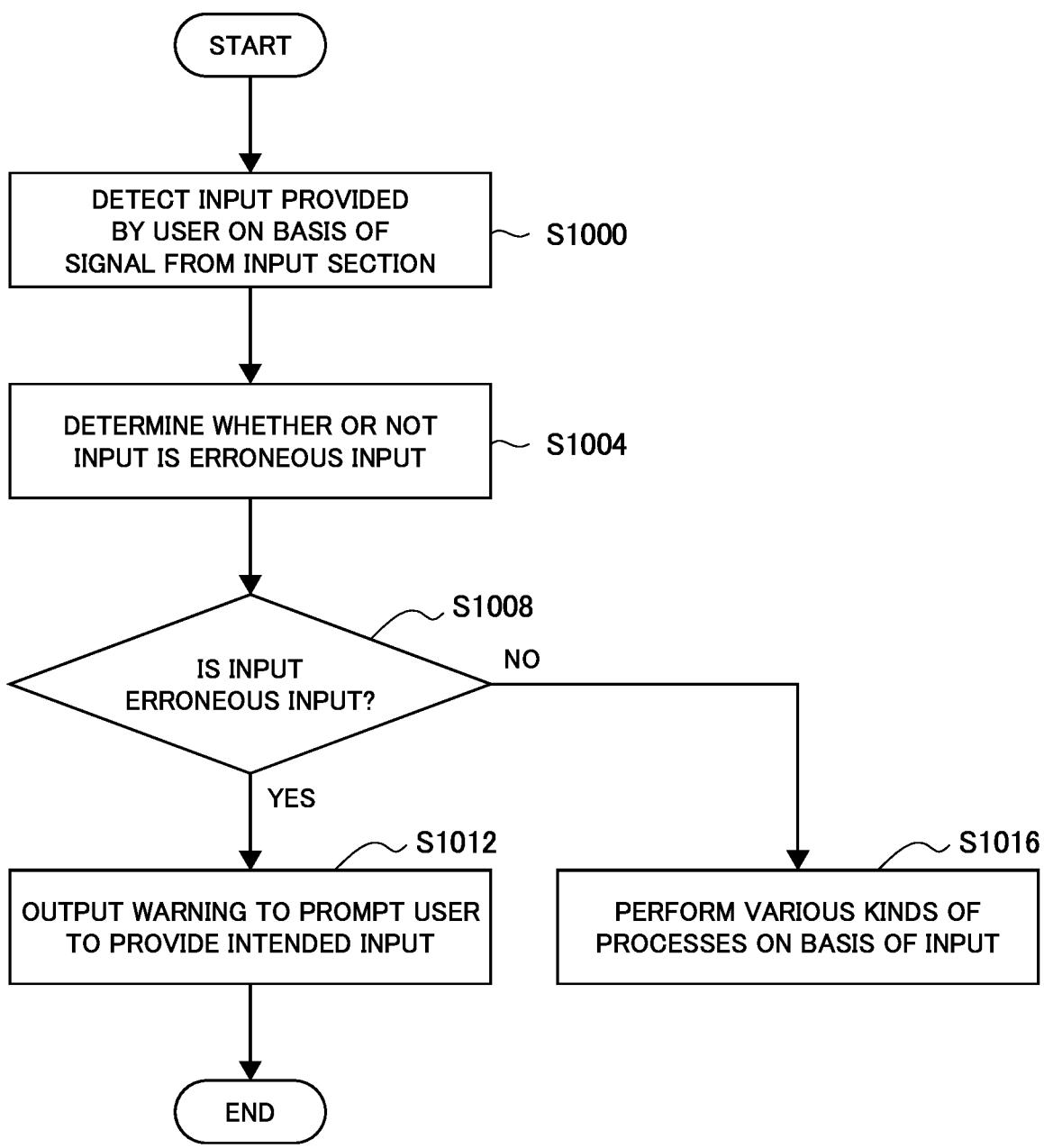
FIG. 6 is a flowchart illustrating an example of a processing flow of the control device according to the present embodiment.

The configuration example of the control device 100 according to the present embodiment has been described above. Next, an example of a processing flow of the control device 100 will be described with reference to FIG. 6. FIG. 6 is a flowchart illustrating the example of the processing flow of the control device.

In Step S1000, the input detection section 111 detects input provided by the user on the basis of a signal from the touch switch 10 (input section). In Step S1004, the erroneous input determination section 112 determines whether or not the input is erroneous input, on the basis of the input detected by the input detection section 111. More specifically, the erroneous input determination section 112 determines whether or not the input is erroneous input on the basis of whether or not the region in which the input is detected in the touch switch 10 includes at least a portion of the erroneous input detection region 11.

In the case where the input is the erroneous input (YES in Step S1008), the processing section 113 outputs a warning to prompt the user to provide intended input by providing the control information to the various kinds of structural elements on the basis of the erroneous input information in Step S1012, and the series of processes ends. In the case where the input is not the erroneous input (NO in Step S1008), the processing section 113 achieves various kinds of processes by providing the control information to the various kinds of structural elements on the basis of the input information in Step S1016, and the series of processes ends.

The processes illustrated in FIG. 6 are repeatedly performed each time the user provides input to the touch switch 10 (input section). Note that, the processing flow of the control device 100 is not limited to the example illustrated in FIG. 6. For example, respective processes in the example of the processing flow illustrated in FIG. 6 may be replaced with other processes, or may be appropriately omitted. In addition, it is also possible to add another process to the processing flow illustrated in FIG. 6.

<4. Modifications>

The example of the processing flow of the control device 100 has been described above. Next, modifications of the present embodiment will be described.

(4.1. Modifications of Input Section and Erroneous Input Detection Region)

First, modifications of the input section and the erroneous input detection region 11 will be described. In the above description, the case where the touch switch 10 serves as the input section has been mainly exemplified. However, the input section is not limited to the touch switch 10.

Figure 7:
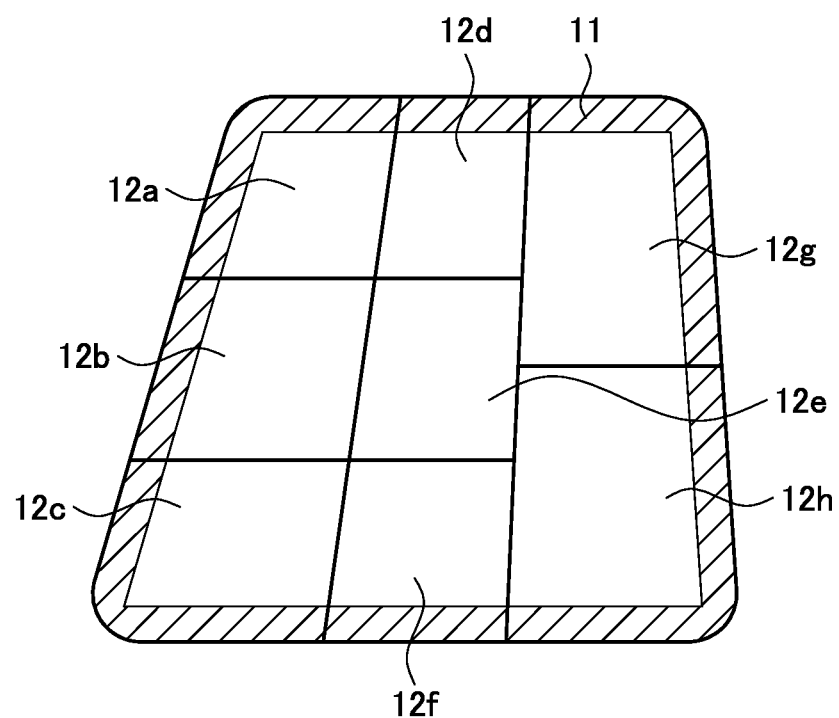
FIG. 7 is a diagram illustrating an example in which one, two, or more mechanical switches are used as the input section according to the present embodiment.

For example, as illustrated in FIG. 7, a mechanical switch group may be used. The mechanical switch group includes one, two, or more mechanical switches 12 (adjacent mechanical switches 12a to 12h in an example illustrated in FIG. 7). Even in the case of using the mechanical switch group, the erroneous input detection region 11 is set in such a manner that the erroneous input detection region 11 includes at least a portion of mechanical switches located in a vicinity of a border of the mechanical switch group. For example, as illustrated in FIG. 7, the erroneous input detection region 11 may be set in such a manner that the erroneous input detection region 11 includes at least a portion of mechanical switches located in the vicinity of the border of the mechanical switch group, and a touch sensor (such as a capacitance sensor, for example) may be disposed in the erroneous input detection region 11. This makes it possible to detect a touch on the erroneous input detection region 11 (in this case, the input section is implemented by the mechanical switch group and the touch sensor). Next, the erroneous input determination section 112 determines that input provided to the mechanical switch group is the erroneous input in the case where the region in which the input is detected includes at least a portion of the erroneous input detection region 11.

Note that, in the case of using the mechanical switch group, it is also possible to detect the input provided to the erroneous input detection region 11 by using a touch sensor other than the capacitance sensor or the like. For example, in the case where each of the mechanical switches 12 included in the mechanical switch group is a two-stage switch, it is possible to detect input provided to the erroneous input detection region 11 on the basis of a signal from the two-stage switch. The two-stage switch makes it possible to vary the input between a first amount of push and a second amount of push, which is larger than the first amount of push. More specifically, the erroneous input determination section 112 may determine that the input provided to the mechanical switch group is the erroneous input in the case where it is detected that a mechanical switch 12 located in the erroneous input detection region 11 is pushed by the first amount of push.

Figure 8:
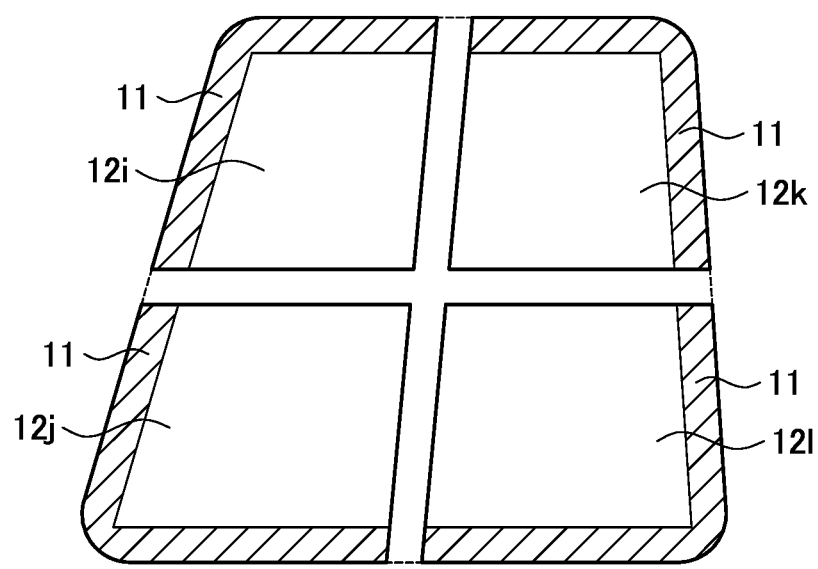
FIG. 8 is a diagram illustrating an example in which separate mechanical switches are used as the input section according to the present embodiment.

The example of the mechanical switch group including the adjacent mechanical switches 12 has been described with reference to FIG. 7. However, the mechanical switches included in the mechanical switch group may be separate from each other. For example, as illustrated in FIG. 8, it is also possible to use a mechanical switch group includes mechanical switches 12i to 12l, which are separate from each other. Also in this case, an erroneous input detection region 11 may be set in such a manner that the erroneous input detection region 11 includes at least a portion of mechanical switches located in a vicinity of a border of the mechanical switch group as illustrated in FIG. 8. Note that, the input section having a discrete form is not limited to the mechanical switch group. For example, it is also possible to use a touch switch group including a plurality of adjacent touch switches 10.

Figure 9:
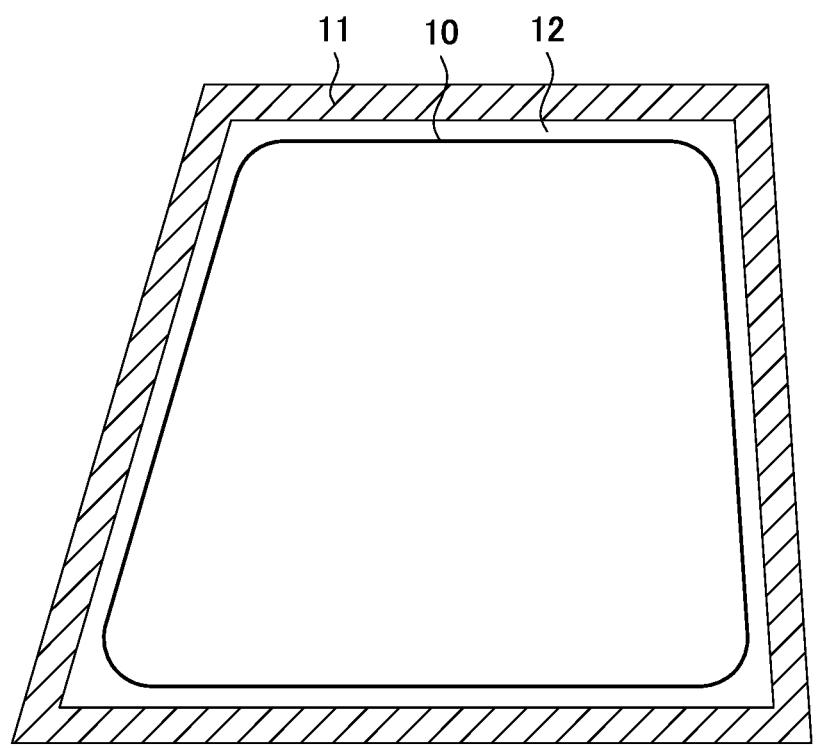
FIG. 9 is a diagram illustrating an example in which the erroneous input detection region includes a region separated from the border of the touch switch.

In addition, as described above, the erroneous input detection region 11 does not necessarily have to include a border of a touch switch 10. The erroneous input detection region 11 may include a region that is a predetermined distance away from the border of the touch switch 10. For example, as illustrated in FIG. 9, the erroneous input detection region 11 may be set in such a manner that a predetermined region 12 in which no touch (input) is detected is sandwiched between the border of the touch switch 10 and the erroneous input detection region 11, and a touch sensor (such as a capacitance sensor, for example) may be disposed in the erroneous input detection region 11. This makes it possible to detect a touch on the erroneous input detection region 11 (in this case, the input section is implemented by the touch switch 10 and the touch sensor).

(4.2. Modifications of Erroneous Input Determination Method)

Next, modifications of the erroneous input determination method will be described.

In the above description, the erroneous input determination section 112 determines that input is erroneous input in the case where a region in which the input is detected includes at least a portion of the erroneous input detection region 11. However, the erroneous input determination section 112 does not necessarily have to determine whether or not input is erroneous input only on the basis of the erroneous input detection region 11.

For example, the erroneous input determination section 112 may determine whether or not the input is erroneous input, on the basis of a situation where the user performs control by using the controller.

For example, the erroneous input determination section 112 may change a method of determining whether or not the input is erroneous input, on the basis of a rotation direction of the steering wheel. In the case where the user turns the steering wheel 1 to the right for making a right turn as described above with reference to FIG. 2, there is a possibility that the user may unintentionally touch the touch switch 2a with his/her left palm and may provide erroneous input. The touch switch 2a is installed on the left spoke section 150 of the steering wheel 1. However, there is a low possibility that the user may unintentionally touch the touch switch 2b with his/her right palm. The touch switch 2b is installed on the right spoke section 150 of the steering wheel 1. Therefore, the erroneous input determination section 112 does not have to determine whether or not erroneous input is provided to the touch switch 10 installed on the right spoke section 150 of the steering wheel, in the case where it is detected that the user has turned the steering wheel to the right for making a right turn. On the other hand, the erroneous input determination section 112 does not have to determine whether or not erroneous input is provided to the touch switch 10 installed on the left spoke section 150 of the steering wheel, in the case where it is detected that the user has turned the steering wheel to the left for making a left turn. This allows the erroneous input determination section 112 to appropriately omit the unnecessary erroneous input determination process.

In addition, the erroneous input determination section 112 may change the method of determining whether or not input is erroneous input on the basis of a position in which a part of a body (such as a thumb or the like) used for providing input is detected (note that, it can also be said that a determination is made "on the basis of a situation where the user performs control by using the controller" even when the determination is made on the basis of a position in which a part of the body used for providing input is detected). For example, it is impossible for the user to touch the touch switch 10 or the like with his/her thumb while the touch sensor (such as the capacitance sensor or the like) is detecting that the thumb of the user is placed on a thumbrest (a portion on which the thumb is placed) installed on the steering wheel. Therefore, the erroneous input determination section 112 may determine that input is erroneous input when the input is provided while the thumb is placed on the thumbrest. This allows the erroneous input determination section 112 to appropriately detect the erroneous input regardless of the erroneous input detection region 11. Note that, the part of the body used for providing the input is not limited to the thumb (in other words, the mechanism used for determining whether or not input is erroneous input is not limited to the thumbrest, either).

In addition, the erroneous input determination section 112 does not have to determine whether or not erroneous input is provided, in the case where it can be considered that no problem occurs on the basis of a control situation even when the erroneous input is provided. For example, there is a low possibility that it may become difficult for the user to drive the car and this may cause a feeling of discomfort (sometimes this may trigger an accident), even if the erroneous input is provided and the HUD, the MID or the like displays various kinds of information while the user is looking back and is backing the car into a parking space. Accordingly, the erroneous input determination section 112 does not have to determine whether or not erroneous input is provided while a predetermined sensor is detecting that the user is backing the car (or the user is looking back and is backing the car). This allows the erroneous input determination section 112 to appropriately omit an unnecessary erroneous input determination process. Note that, the situation where it can be considered that even if the erroneous input is provided, no problem occurs is not limited to the situation where the car is driven in reverse.

In addition, it is also possible for the erroneous input determination section 112 to change the method of determining whether or not input is erroneous input, on the basis of a user's habit observed when the user operates the controller. For example, when various kinds of sensors analyze current or old habits of holding the steering wheel during operation of the steering wheel, the erroneous input determination section 112 may control the shape and position of the erroneous input determination region 11 (for example, may set the erroneous input detection region 11 to a portion that the user tends to touch erroneously), or may omit the erroneous input determination process with regard to a user whose frequency of erroneous touch is low. Note that, to analyze the user's habits of operating the controller, it may be possible to use a machine learning algorithm, an artificial intelligence algorithm, or the like. Here, for example, the machine learning algorithm and the artificial intelligence algorithm may be generated on the basis of a machine learning approach and a statistical approach. Examples of the machine learning approach include a neural network, a regression model, and the like.

In addition, it is also possible for the erroneous input determination section 112 to determine whether or not input is erroneous input, on the basis of the order of input operations performed by the user. For example, in the case where the user provides input to the touch switch 10, it is assumed that the user appropriately provides input without touching the erroneous input detection region 11 at the beginning of input, but then the user slides his/her thumb and touches the erroneous input detection region 11. In this case, the erroneous input determination section 112 determines that the user's intended input is continuing and this input to the erroneous input detection region 11 is appropriate input even when the erroneous input detection region 11 is being touched. This makes it possible to effectively use the region of the touch switch 10 including the erroneous input detection region 11. In the case where the input section such as the touch switch 10 is installed on the controller such as the steering wheel, the size of the input section is often limited to a small size. Therefore, it can be said that the above-described determination methods are more useful in such a case.

In addition, the erroneous input determination section 112 may determine that input is appropriate input on the basis of an additionally performed input operation of indicating that an input operation is the user's intended operation. For example, in the case where the user provides input by performing a flick operation (operation of sliding a tip of a finger while the tip of the finger is remaining in contact with the touch switch 10) and then touching the touch switch 10, the erroneous input determination section 112 may determine that this input is appropriate input intended by the user.

In addition, the input determination section 112 may determine whether or not input is erroneous input, on the basis of the size or shape of a region in which the input is detected in the input section. More specifically, in the case where the touch switch 2a is used as the input section as described above with reference to FIG. 3A and the user's intended input is provided, the input detection region 3a is characterized by a smaller oval shape. Therefore, in the case where the input detection section 111 recognizes the size or shape of the region in which the input is detected on the basis of a signal from the input section, the erroneous input determination section 112 may determine whether or not the input is erroneous input on the basis of whether or not the size or shape of the region in which the input is detected satisfies the above-described characteristic condition that the region has the (smaller) oval shape.

<5. Conclusion>

As described above, the control device 100 according to the present embodiment detects input provided by a user to the input section installed on the controller that is operated by the user, and determines whether or not the input is erroneous input, on the basis of the input. More specifically, the control device 100 according to the present embodiment determines whether or not the input is erroneous input, on the basis of a region in which the input is detected in the input section. Therefore, it is possible for the control device 100 according to the present embodiment to detect erroneous input more appropriately.

Hereinabove, although the preferred embodiments of the present invention have been described with reference to the accompanying drawings, it goes without saying that the present invention is not limited thereto. It will be clear to a person of ordinary skill in the art of the present invention that various modifications and improvements may be obtained within the scope of the technical idea recited by the scope of the patent claims, and these should obviously be understood as belonging to the range of technology of the present invention.

REFERENCE SIGNS LIST 100 control device
110 control section
111 input detection section
112 erroneous input determination section
113 processing section
120 transmission/reception section
130 storage section
150 spoke section
10 touch switch (input section)
2a, 2b touch switch (input section)
1 steering wheel (controller)

The invention claimed is:

1. A control device, comprising:
an input detection section configured to detect an input provided by a user to an input section, the input section being on a controller that is operated by the user; and
an erroneous input determination section configured to determine whether or not the input is an erroneous input, on a basis of the input,
wherein the erroneous input determination section determines whether or not the input is the erroneous input, on a basis of a region in which the input is detected in the input section, and
the erroneous input determination section determines that the input is the erroneous input in a case where the region in which the input is detected in the input section includes at least a portion of an erroneous input detection region, which is set in the input section.

2. The control device according to claim 1,
wherein the erroneous input detection region includes at least a portion of a vicinity of a border of the input section.

3. The control device according to claim 1,
wherein the erroneous input determination section further determines whether or not the input is the erroneous input, on a basis of size or a shape of the region in which the input is detected in the input section.

4. The control device according to claim 1,
wherein the erroneous input determination section changes a method of determining whether or not the input is the erroneous input, on a basis of a situation where the user performs control by using the controller.

5. The control device according to claim 1,
wherein the input section includes at least any one of a first input section of receiving the input provided by touch and a second input section of receiving the input provided by pressure.

6. The control device according to claim 1, wherein the controller includes a steering wheel of a vehicle, and the input section is on a spoke section of the steering wheel.

7. The control device according to claim 1, wherein the input section includes a touch sensor and a plurality of mechanical switches, the plurality of mechanical switches being in a periphery of the input section, and the erroneous input determination section determines that the input is the erroneous input based on inputs to the plurality of mechanical switches and to the touch sensor.

8. The control device according to claim 1, wherein the input section includes two input sections, and the erroneous input determination section determines whether or not the input is the erroneous input for a first input section of the two input sections in response to the control device being turned a first direction, and does not determine whether or not the input is the erroneous input for a second input section of the two input sections in response to the control device being turned the first direction.

9. A control device comprising:
a processor; and
a memory including a program that, when executed by the processor, causes the processor to perform operations, the operations including:
detecting an input provided by a user to an input area, the input area being on a controller that is operated by the user; and
determining whether or not the input is an erroneous input, on a basis of the input, wherein the processor determines whether or not the input is the erroneous input, on a basis of a region in which the input is detected in the input area, and the processor determines that the input is the erroneous input in a case where the region in which the input is detected in the input area includes at least a portion of an erroneous input detection region, which is set in the input area.

10. The control device according to claim 9, further comprising:

the input area, the input area including a touch sensor and a plurality of mechanical switches, the plurality of mechanical switches being in a periphery of the input area, wherein the processor determines that the input is the erroneous input based on inputs to the plurality of mechanical switches and to the touch sensor.

11. The control device according to claim 9, wherein the input area includes two input areas, and the processor determines whether or not the input is the erroneous input for a first input area of the two input areas in response to the control device being turned a first direction, and does not determine whether or not the input is the erroneous input for a second input area of the two input areas in response to the control device being turned the first direction.

* * * * *